United States Patent
Segal et al.

(12)

(10) Patent No.: US 6,592,184 B1
(45) Date of Patent: Jul. 15, 2003

(54) SELF-INFLATING CUSHION AND VALVE THEREFOR

(75) Inventors: Colin Segal, Double Bay (AU); Joan Betty Weisz, 69 Balfour Road, Kensington, New South Wales 2033 (AU)

(73) Assignee: Joan Betty Weisz, New South Wales (AU)

( * ) Notice: Subject to any disclaimer, the term of this patent is extended or adjusted under 35 U.S.C. 154(b) by 0 days.

(21) Appl. No.: 09/582,305

(22) PCT Filed: Apr. 6, 1999

(86) PCT No.: PCT/AU99/00253
§ 371 (c)(1),
(2), (4) Date: Jan. 10, 2001

(87) PCT Pub. No.: WO99/51899
PCT Pub. Date: Oct. 14, 1999

(Under 37 CFR 1.47)

(30) Foreign Application Priority Data

Apr. 6, 1998 (AU) .............................................. PP2842

(51) Int. Cl.[7] .............................................. A47C 27/18
(52) U.S. Cl. .................................... 297/284.6; 297/397
(58) Field of Search .............................. 297/284.6, 397, 297/DIG. 8

(56) References Cited

U.S. PATENT DOCUMENTS

| 3,785,395 | A | * | 1/1974 | Andreasson | ................ 137/223 |
|---|---|---|---|---|---|
| 3,864,766 | A | * | 2/1975 | Prete, Jr. | ........................ 5/644 |
| 4,389,961 | A | * | 6/1983 | Parish | ........................ 114/345 |
| 4,579,141 | A | * | 4/1986 | Arff | ............................ 137/223 |
| 4,927,397 | A | * | 5/1990 | Yeager | ........................ 441/41 |
| 5,033,133 | A | * | 7/1991 | Nissen | ............................ 5/653 |
| 5,117,517 | A | * | 6/1992 | Su | ............................... 5/709 |
| 5,267,363 | A | * | 12/1993 | Chaffee | ........................ 5/710 |
| 5,303,435 | A | * | 4/1994 | Haar et al. | ..................... 5/709 |
| 5,469,592 | A | * | 11/1995 | Johnson | ........................ 5/654 |
| 5,552,205 | A | * | 9/1996 | Lea | .............................. 428/74 |
| 5,829,832 | A | * | 11/1998 | Molce et al. | ............... 297/397 |
| 5,918,332 | A | * | 7/1999 | Dees | ............................. 5/639 |

FOREIGN PATENT DOCUMENTS

| AU | WO-97/19622 A1 | * | 6/1997 |
| DE | 4034121 A1 | * | 10/1991 |

* cited by examiner

Primary Examiner—Peter M. Cuomo
Assistant Examiner—Joseph Edell
(74) Attorney, Agent, or Firm—Abelman, Frayne & Schwab (57) ABSTRACT

A self-inflating support device or cushion (10) consists of an envelope (11) defining a closed space, a compressible material contained within the envelope (11) and valve means (15) adapted to allow air into the envelope (11) so that the compressed material can expand to enlarge the support device (10) and to allow air out of the envelope (11) so that the material may be compressed and the support device (10) reduced in size. The valve means (15) comprises a valve member (21) and a valve seat (22) adapted to form a seal therebetween when the valve (15) is closed, an actuator (20) which whilst actuated separates the valve member (21) and valve seat (22) to permit air flow into and out of the device (10) for adjustment of the volume of air within the device (10) and locking means (26, 47) for maintaining the valve (15) fully open when it is desired to fill or empty the device (10) with air.

26 Claims, 9 Drawing Sheets

SELF-INFLATING CUSHION AND VALVE THEREFOR

FIELD OF INVENTION

This invention relates to self-inflating devices and to valves which allow air to enter or escape from enclosures such as self-inflating devices.

BACKGROUND ART

Self-inflating cushions have many uses including lumbar support, neck support, hip protection, seat cushions and the like. For the sake of convenience, the invention will be described in relation to a self-inflating cushion for supporting a body part but the invention is not limited thereto.

Many people suffer from back or neck pain and require some form of support to help alleviate the discomfort they endure. Present day lifestyles can result in weak or underdeveloped back muscles. Many people sit in uncomfortable or poorly designed seating which accentuates or exacerbates the problem. For example, sitting for long periods in an office or other work place, travelling in automobiles or on aircraft, or even sitting on a chair watching television, can result in an individual suffering discomfort from back pain if, for example, the seating is poorly designed, or if the individual does not practise correct posture positions, or if the individual already has some anatomical deterioration of the spine.

Discomfort from spinal pain can often be avoided or reduced by the use of cushions or other lumbar support means. However, the problem with most support cushions is that they are often of a shape which provides inadequate or improper support of the spine and/or they are of a shape which makes them inconvenient or difficult to carry or to store.

Inflatable back, head and neck support cushions are known, but these tend to rely entirely on air pressure or on a soft or expandable substance, such as wool or foam, respectively, for their shape and support. In many cases this means that use and adjustment is inadequate or inconvenient.

Known self-inflating cushions suffer from a number of disadvantages arising from the operation of the valve which allows air to enter or escape from the cushion. This is the case in respect of the self-inflating cushion disclosed in International Patent Application PCT/AU96/00761. The object of this invention is to provide an improved self-inflating cushion and an improved valve for such cushions and other enclosures.

SUMMARY OF THE INVENTION

According to one aspect of the invention there is provided a self-inflating device comprising an envelope defining a closed space, a compressible material contained within the envelope and valve means adapted to allow air into the envelope so that the compressed material can expand to enlarge the support device and to allow air out of the envelope so that the material may be compressed and the support device reduced in size, said valve means comprising a valve member and a valve seat adapted to form a seal therebetween when the valve is closed, an actuator which whilst actuated separates the valve member and valve seat to permit air flow into and out of the device for adjustment of the volume of air within the device and locking means for maintaining the valve fully open when it is desired to fill or empty the device with air.

According to another aspect of the invention there is provided a valve for controlling the flow of air into and out of an enclosure such as a self-inflating cushion comprising a valve member and a valve seat adapted to form a seal therebetween when the valve is closed, an actuator which whilst actuated separates the valve member and valve seat to permit air to flow into and out of the enclosure for adjustment of the volume of air within the enclosure and locking means for maintaining the valve fully open when it is desired to fill or empty the enclosure with air.

In one form of the invention, the actuator is connected to the valve member and spring biased so as to retain the valve member and valve seat in their closed position. The actuator is arranged so that upon an initial movement it separates the valve member and valve seat to allow adjustment of the volume of air in the enclosure and upon further movement is locked into a position which maintains the valve fully open.

In another form of the invention, the locking means includes a release tab having a catch adapted to engage a tab on the actuator to hold the valve open. The release tab is mounted on an arm which is movable between a first position in which the catch engages the actuator tab so that the valve is locked open and a second position in which the catch is disengaged from the actuator tab so that the valve can close.

In a one embodiment of the invention the valve member is connected to the actuator, the arrangement being such that the actuator opens the valve by moving the valve member away from the valve seat and that the locking means is engaged only when the valve is fully open.

MODES FOR CARRYING OUT THE INVENTION

Figure 1:
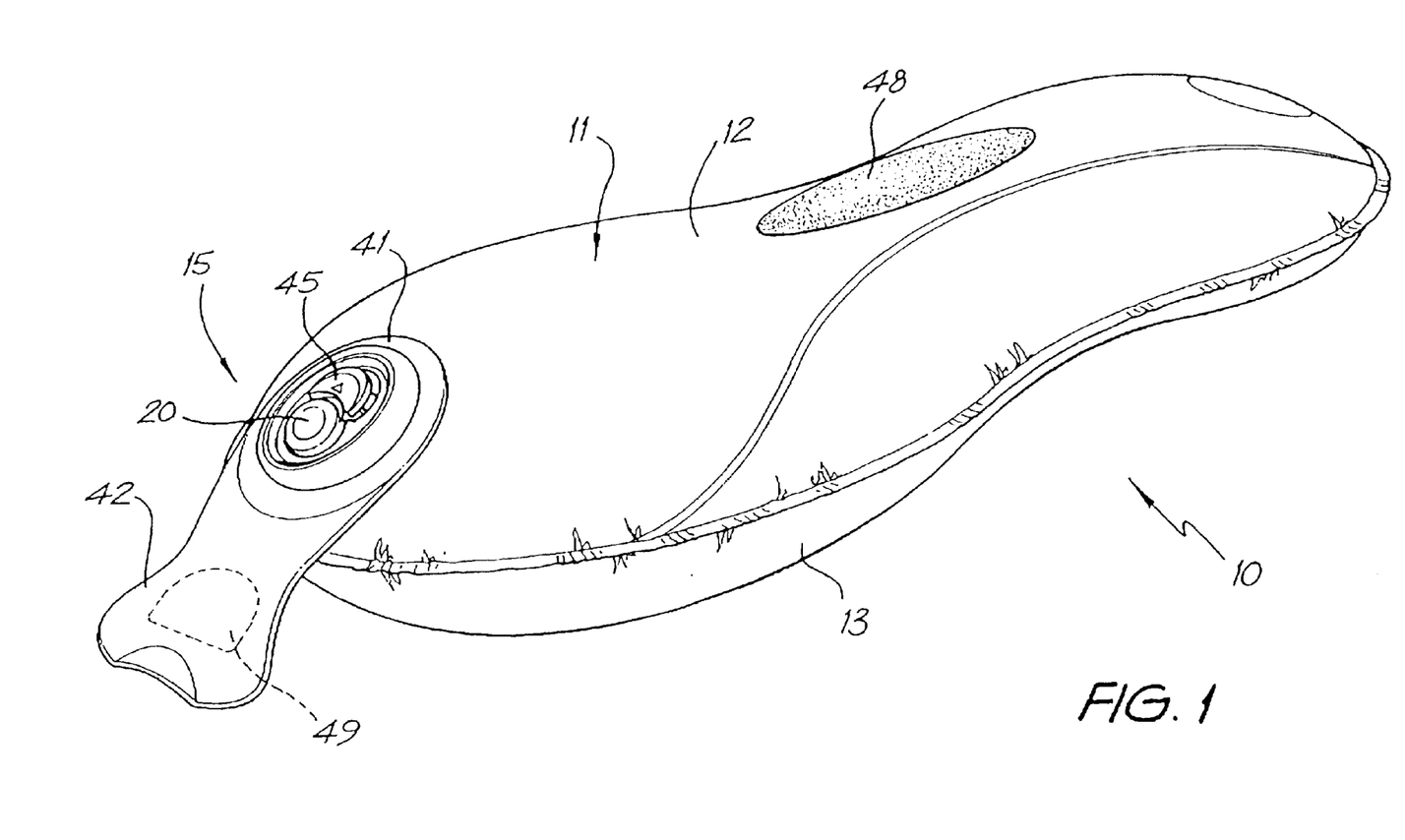
FIG. 1 is a perspective view of a self-inflating cushion according to one embodiment of the invention.

The self-inflating cushion or body part support device 10 shown in FIG. 1 includes an envelope 11 defining a closed space between a first or upper sheet portion 12 and a second or lower sheet portion 13. The envelope contains a compressible resilient open-celled foam material preferably cut or moulded to a predetermined shape, which shape it assumes when not under compression. When not in use, the envelope 11 (enclosing the foam material is manually compressible to only several millimeters of thickness and kept compressed by appropriate restraining means.

To enable adjustment, the body part support device 10 is inflatable/deflatable by means of a two-way valve means 15. The valve means 15 may be adapted to operate over the entire interior closed space, or may be such that a system of inflatable air chambers are provided for selectively adjusting the rigidity of the device for individualised lumbar support.

The valve means 15 shown in FIGS. 2 to 5 includes a valve actuator 20, a valve member 21, a valve seat 22 and an "O-ring" ring 23 which, when the valve is closed, forms a seal between the valve member 21 and the valve seat 22. The valve actuator 20 has a body portion 24 and a peripheral locking tab 26. The valve member 21 is secured to the actuator 20 by screw 25 that engages the body portion 24.

Upstanding from the valve member 21 is a tubular portion 28 that receives the lower end of the body portion 24 when the screw 25 is fully in place.

The valve seat 22 forms part of the valve base 30 which has air flow passageways 31 formed in an upstanding cylindrical wall 33. As can be seen in FIGS. 2 to 5, the assembly of the actuator 20 and the valve member 21 traps the compression spring 34 between the annular face 32 of the valve base 30 and the lower face of the top portion of the actuator 20. The "O"-ring 23 is seated on flange 35 of the valve member 21 in groove 36.

The cylindrical wall 33 guides the spring 34 to ensure correct positioning and movement and has an internal enlarged bore 33a for guiding the tubular portion 28 of the valve member 21 to prevent rocking or misalignment.

The valve base 30 also has a downwardly depending cylindrical portion 37 which is spaced slightly from and guides the peripheral wall of the valve member 21 to ensure smooth operation and correct positioning. Ribs 38 between the main portion 39 of the valve base 30 and the cylindrical portion 37 prevent or minimise distortion of the valve base 30 so that the valve seat 22 remains flat and even.

Figure 4:
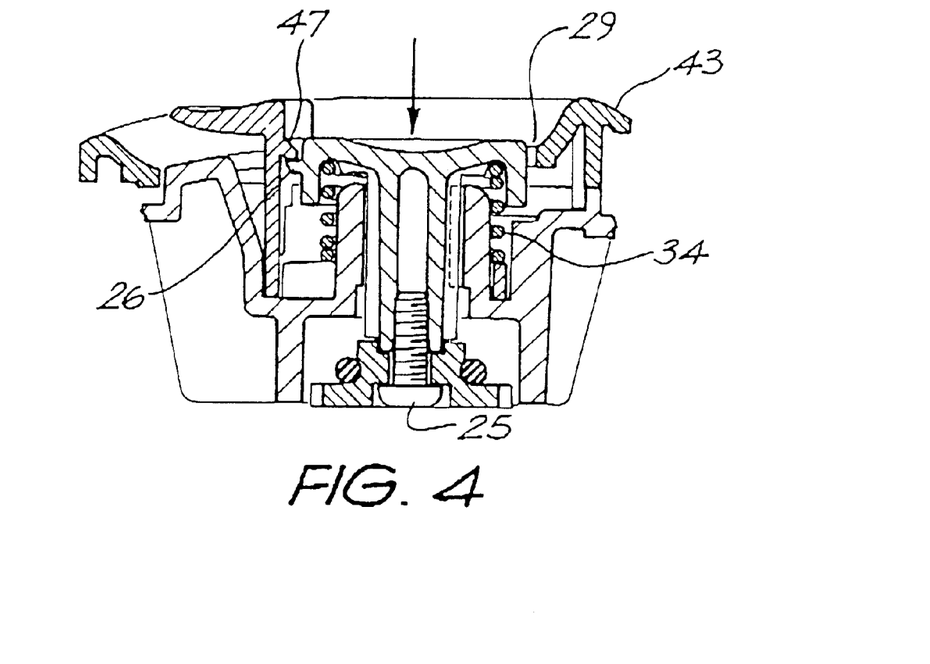
FIG. 4 is a view similar to FIG. 2 with the valve locked open to allow air to be discharged from the cushion.

The valve means 15 is connected to self-inflating cushion by heat welding the skin of the cushion between the outer annular surfaces 40, 41a of the ring 30a of the valve base 30 and the tab ring 41. Tab ring 41 which is secured to the valve base 30 has a tab 42 which is used to secure the cushion in its rolled or folded disposition when deflated. A cover 43 which overlies the central portion of the valve base 30 has an opening 44 to provide access to the valve actuator 20 and to release tab 45 on the upper end of arm 46. Beneath the release tab 45 there is a locking protrusion 47 against which the locking tab 26 rests when the valve is locked in the open position as shown in FIG. 4. There is an air flow gap 49 between the actuator 20 and the cover 43.

Figure 2:
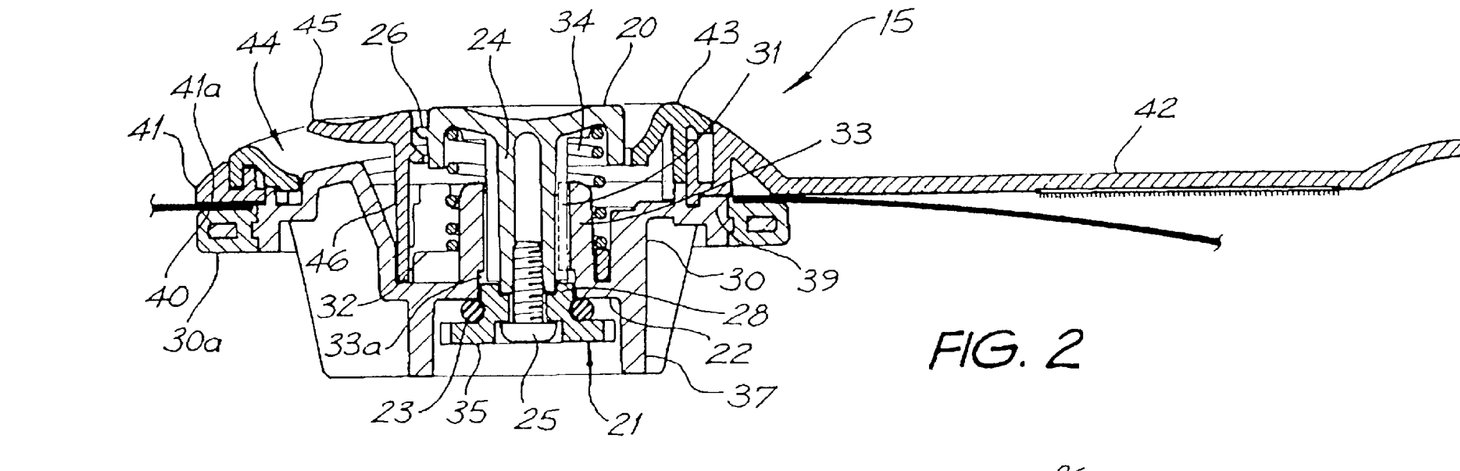
FIG. 2 is a cross-sectional view of the valve of the self-inflating cushion shown in FIG. 1 with the valve being shown in its closed position.
Figure 3:
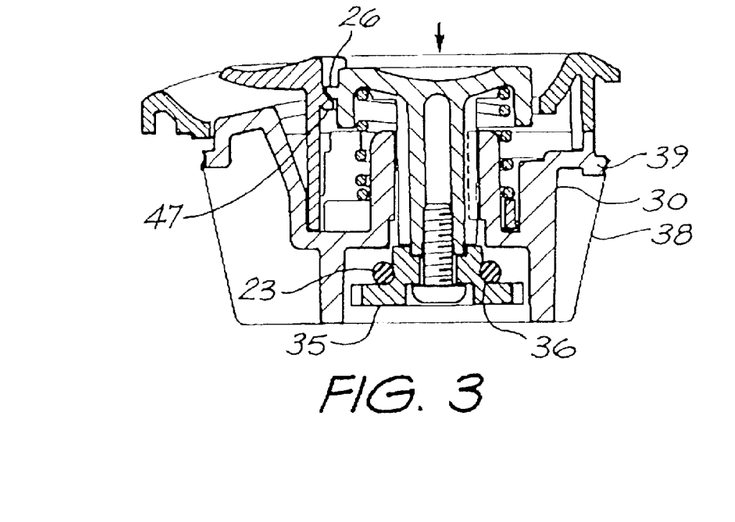
FIG. 3 is a view similar to FIG. 2 with the valve actuator depressed to allow air into and out of the cushion for small adjustments of the air pressure within the cushion.

The valve 15 is shown in its fully closed position in FIG. 2 with the spring 34 acting on the lower face of the top portion of the actuator 20 to drive the valve member 21 towards the valve seat 22 so that the "O"-ring 23 is compressed therebetween to prevent air entering or leaving the cushion 10.

When the valve actuator 20 is depressed (see FIG. 3), the "O"-ring seal 23 breaks its seal against the valve seat 22 allowing air to enter or escape from the cushion for small adjustment of the air pressure within the cushion. With further depression of the actuator 20, the lower face of the locking tab 26 engages against the inwardly tapered upper face of the locking catch 47 which is deflected outwardly to allow the locking tab 26 to snap past the locking catch 47 with the upper face of the tab 26 engaging the lower face of the locking catch 47 to hold the valve 15 in its fully opened position as shown in FIG. 4.

Figure 5:
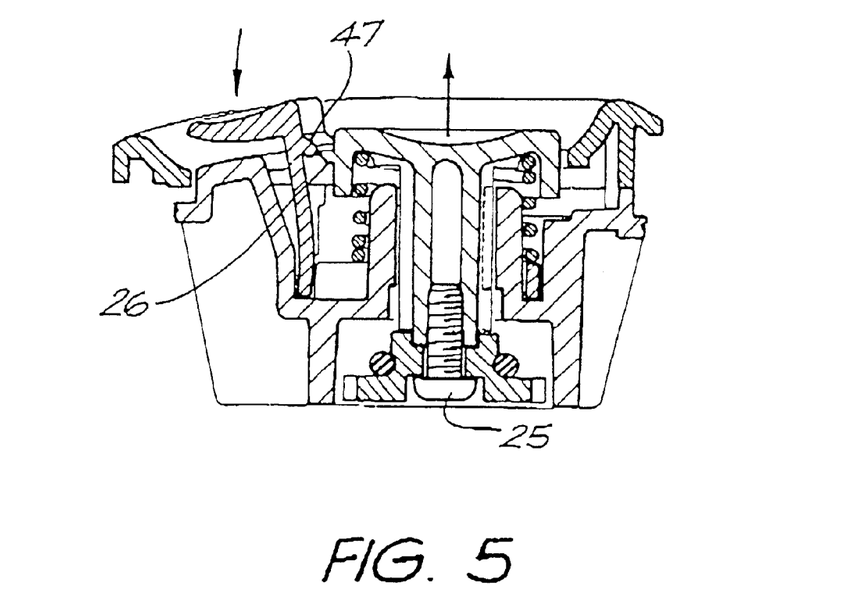
FIG. 5 is a view similar to FIG. 2 with the valve unlocked and moving towards its closed position.

The valve 15 is returned to its closed position by forcing the tab 45 downwardly and outwardly as indicated in FIG. 5 so that the locking catch 47 moves clear of the locking tab 26 whereupon the spring 34 acts to close the valve 15 as shown in FIG. 2. Thus, the embodiment of the valve 15 shown in FIGS. 2 to 5 provides press button operation with partial depression allowing adjustment of the air pressure within the cushion and full depression actuates the locking catch 47 to hold the valve fully open so that all air in the cushion can be discharged. The arrangement of the locking catch 47 and the locking tab 26 also provides tactile feedback as to the mode of operation of the valve 15.

Figure 6:
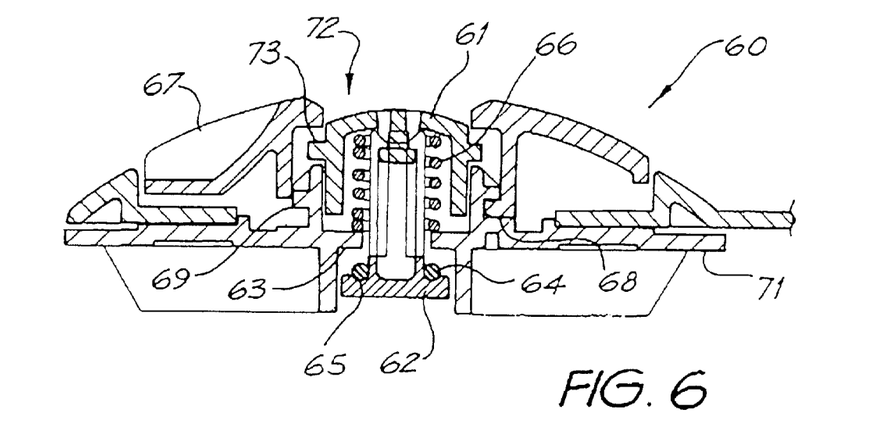
FIG. 6 is a cross-sectional view of a modified valve for the self-inflating cushion shown in FIG. 1, with the valve actuator depressed to allow air into and out of the cushion for small adjustment of the air pressure within the cushion.
Figure 7:
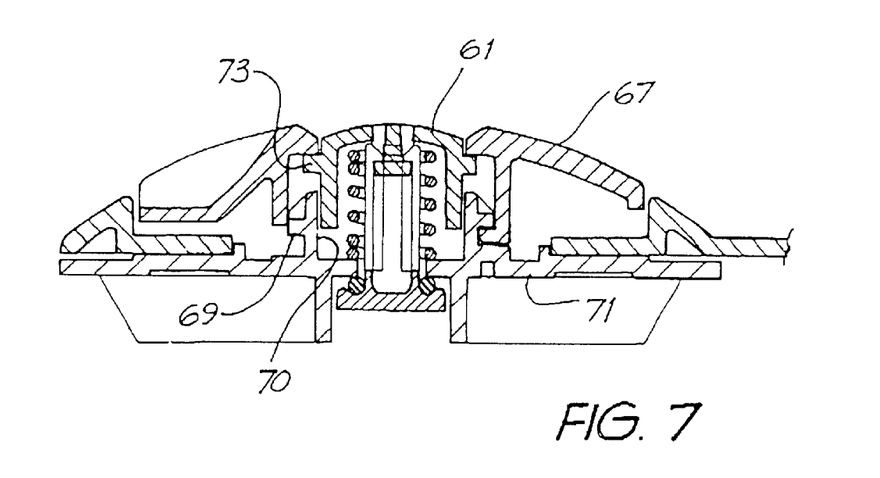
FIG. 7 is a view similar to FIG. 6 with the valve being shown in its closed position.
Figure 8:
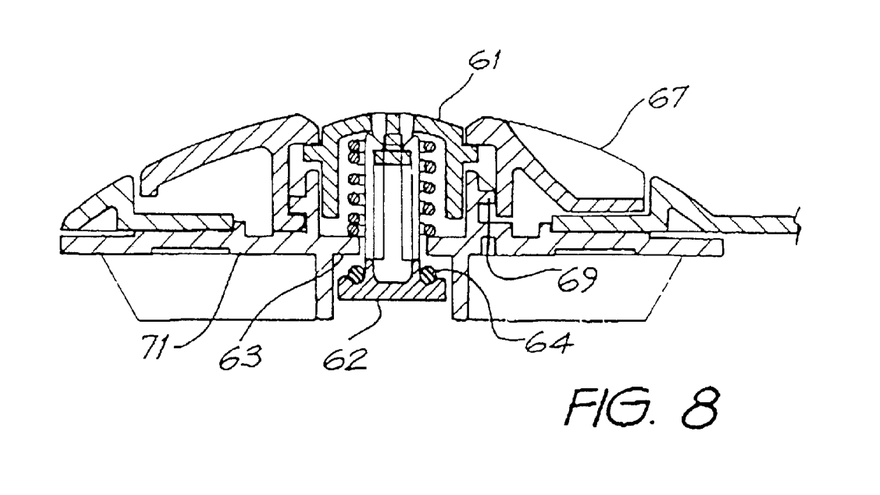
FIG. 8 is a view similar to FIG. 6 with the valve shown in its fully opened position.

The second embodiment of the valve 60 shown in FIGS. 6 to 8 provides for rotational release of the valve to its fully opened position and press button operation for adjustment of the air pressure within the cushion. The valve 60 includes a valve actuator 61, a valve member 62, valve seat 63 and an "O"-ring 64 seated in a groove 65 in the upper face of the valve seat 63. The valve seat 63 is connected to the valve actuator 61 in any convenient way such as the snap fit arrangement of FIGS. 2 to 5. The spring 66 biases the valve member 62 to its closed position as shown in FIG. 7. Depression of the valve actuator 61 moves the valve member 62 from the valve seat 63 to allow air into and out o the cushion for adjustment of the air pressure within the cushion.

Movement of the valve 60 into and out of its fully opened position (see FIG. 8) is achieved by a rotatable nut 67 having a thread engaging inwardly directed surface 68 which is positioned on the underside of the thread 69 on the outer face of the upstanding tubular portion 70 of the valve base 71. The nut 67 has a central opening 72 to provide access lo the valve actuator 61 and the valve actuator 61 has a flange 73 which engages the periphery of the opening 72.

Anticlockwise rotation of the nut 67 causes the thread engaging surface 68 to screw down half a turn on the thread 69 and the engagement of the flange 73 of the valve actuator 61 with the nut 67 forces the valve actuator 61 and valve member 62 downwards to open the valve as shown in FIG. 8.

Figure 9:
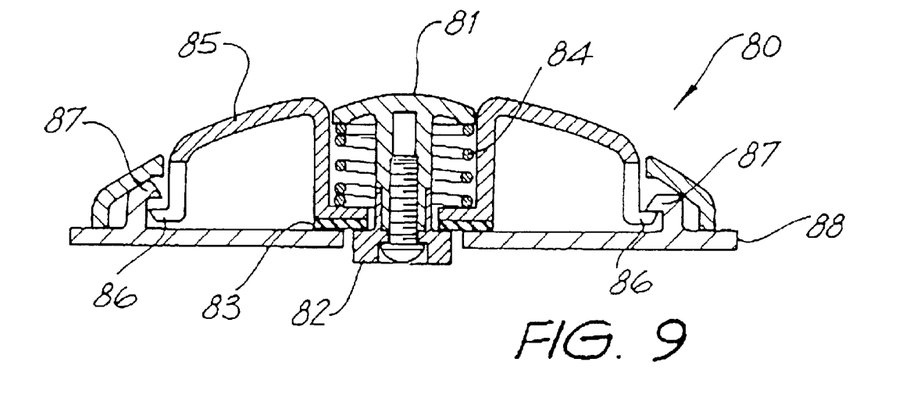
FIG. 9 is a cross-sectional view of another valve for the self-inflating cushion shown in FIG. 1, the valve being shown in its closed position.
Figure 10:
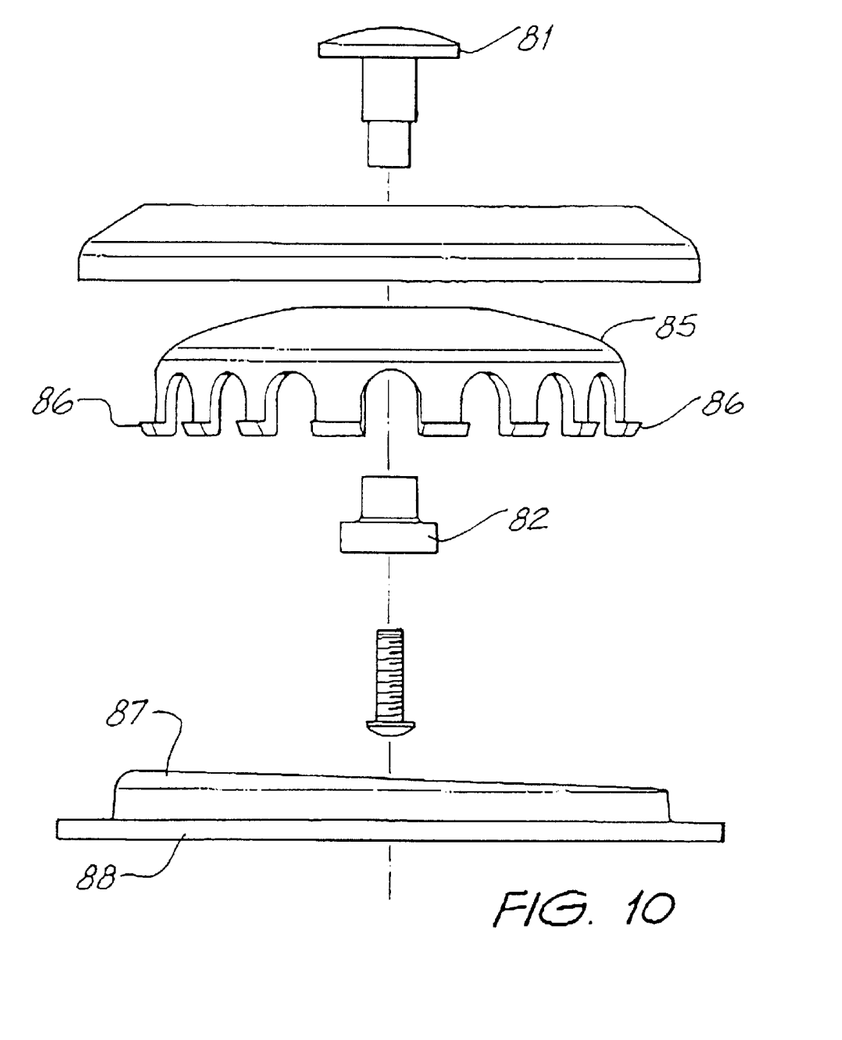
FIG. 10 is an exploded view of the valve shown in FIG. 9.

The third embodiment of the valve 80 shown in FIGS. 9 and 10 also provides for rotational release of the valve to its fully open position as was the case with the second embodiment. The valve 80 has a valve actuator 81, a valve member 82, a valve seat or seal 83 and spring 84. The rotatable nut 85 has a flange 86 which is engaged withe the thread 87 formed on the valve base 88.

Depression of the valve actuator 81 moves the valve member 82 away fro the seal 83 to open the valve partially to permit adjustment of the air pressure within the cushion. Anticlockwise rotation of the nut 85 causes the nut 85 to move away from the valve base 88 thereby raising the seal 83 from the valve member 82 to open the valve. Clockwise rotation of the nut 85 will move the valve to its closed position as shown in FIG. 9.

Figure 11:
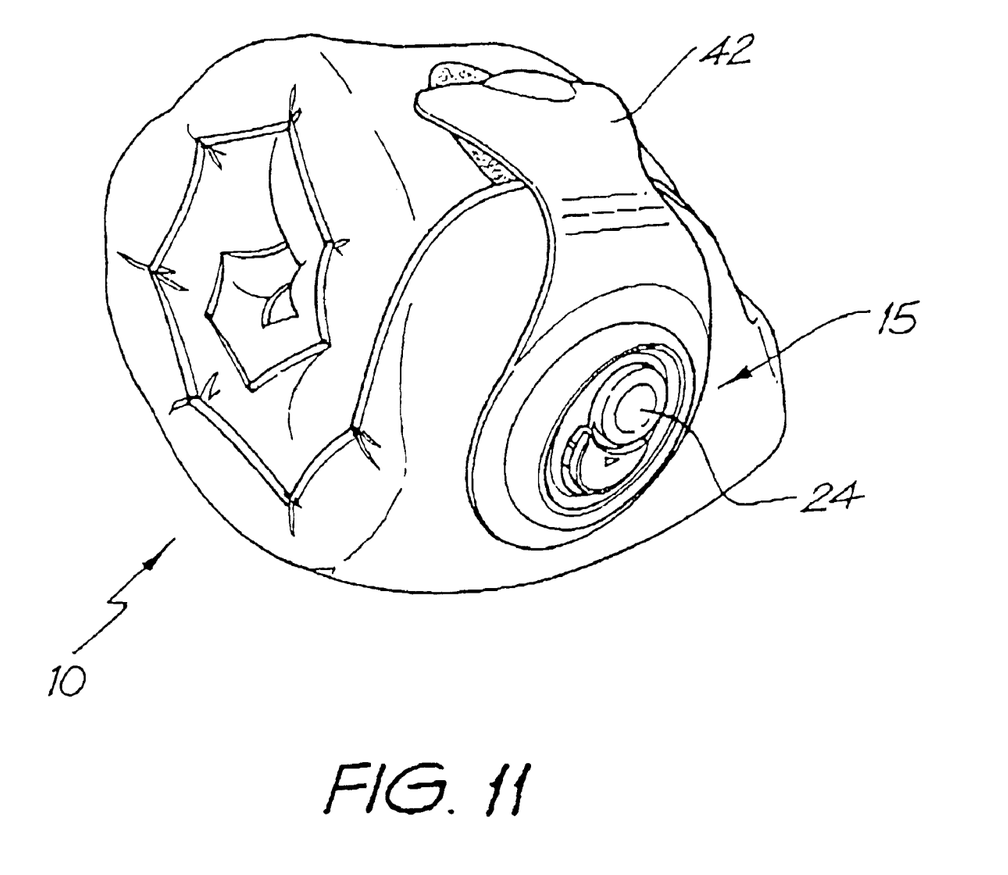
FIG. 11 is a perspective view of the cushion shown in FIG. 1 in its deflated, rolled up state.

The self-inflating cushion 10 is shown in its inflated state in FIG. 1 and in its deflated, rolled up state in FIG. 11. The cushion 10 is secured into its rolled up state as shown in FIG. 11 by the engagement of a VELCRO pad 49 on the back of tab 42 with VELCRO pads 48 on the front of the cushion 10.

In use, the cushion 10 is released by undoing the VELCRO connection 48, 49 and opening the valve 15 (see FIG. 4) thereby allowing the resiliency of the foam to "pop open" the cushion 10 and cause it to lie flat and substantially inflated. The valve 15 is then closed (see FIG. 2) and the cushion 10 may then be placed between the user's back and appropriate support means, such as a seat back. If required, final adjustments can then be made to the cushion 10 by depressing the actuator 24 to reduce internal pressure (see FIG. 3). It is a feature of the cushion 10 that this fine adjustment can be made in situ y use of the actuator 24. Typically, backward pressure by the user squashes the cushion 10 against the seat back and forces air to be expelled on depression of the actuator 24, or, if the cushion 10 is then too thin, the user may, whilst continuing to depress the actuator 24, lean forward and allow the resiliency of the compressed foam to partially or wholly re-inflate the cushion 10 to a thicker configuration. Release of the actuator 24 (which may conveniently be operated in situ by the user's thumb or finger), automatically seals The cushion 10 at the selected level of inflation.

If required, VELCRO strips or other suitable means can be provided for attachment of the body part support cushion 10 to a required position on, say, a seat back when the device is to be used for lumbar support.

Figure 12:
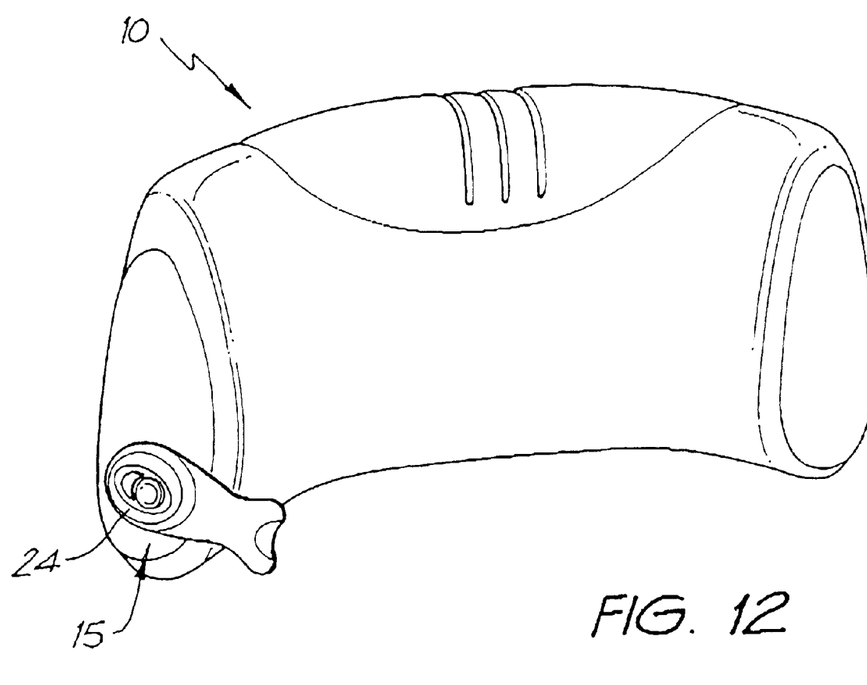
FIG. 12 is a perspective view of a different cushion incorporating the valve of the invention.
Figure 13:
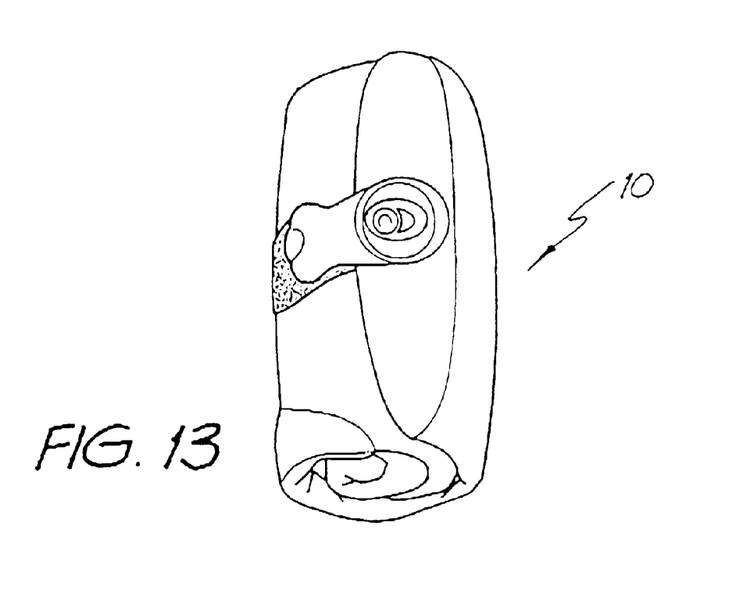
FIG. 13 is a perspective view of the cushion shown in FIG. 12 in its deflated, rolled up state.

A cushion 50 of different configuration is shown inflated in FIG. 12 and deflated in FIG. 13.

A further alternative embodiment of the invention, not shown in the drawings, the cushion 10 can be provided in the form of a strap-on type belt; for example, worn under clothing, or under a coat and strapped to the user's lower back at about waist height for individualised lumbar support. The cushion 10 is then adjusted to help relax muscles and to encourage proper alignment of the lower back.

When not in use, the valve 15 is open, (see FIG. 4) and the cushion 10 rolled up to compress the foam manually to several millimeters of thickness. The valve 15 is then closed (see FIG. 2). It may be retained in this position until required for use again, whereupon the fastening tab 42 is released. When unrolled, the resilient open-celled material has an elastic "memory" whereby, provided that the valve 15 is left open, it assumes its previous non-compressed thickness almost instantaneously. The final shape and degree of hardness is adjusted according to individual requirements by manipulation of the actuator 24.

The cushion 10 incorporating the valve 15 o the present invention may be produced in various shapes and sizes including configurations suitable for head and neck supports, as well as back supports, foot supports and buttock supports. Each conforms to an overall, conceptual design which is universal in its ability to be fitted or used in virtually any situation requiring a spinal or other body part support The relatively small size and simple design of the cushion is such that it is unobtrusive when in use so as not to effect a disconcerting presence when used in public places or the like.

Because the cushion is portable, easy to use and also to fold away, it finds ready application in almost any environment, such as at home, in the office, or with travellers.

The valve 15 of the present invention is mechanically simple to ensure reliable operation. The outer envelope of the cushion 10 can be fabricated from suitable flexible sheet plastics material such as polyvinyl chloride (PVC), or from machine washable rubberised nylon, cotton or canvas. The compressible open-celled material is readily available as resilient or flexible polystyrene or polyurethane foams, or the like.

Figure 14:
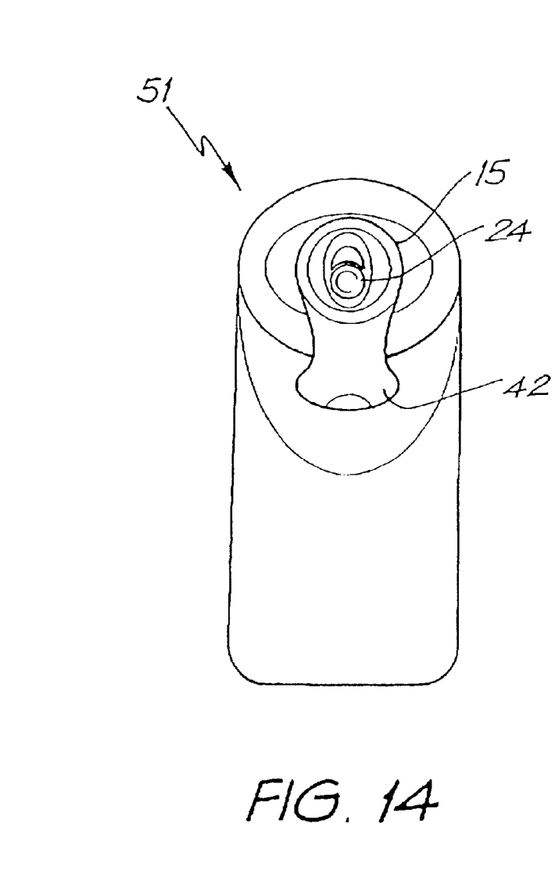
FIG. 14 is a front view of a neck support cushion incorporating a valve of the invention.
Figure 15:
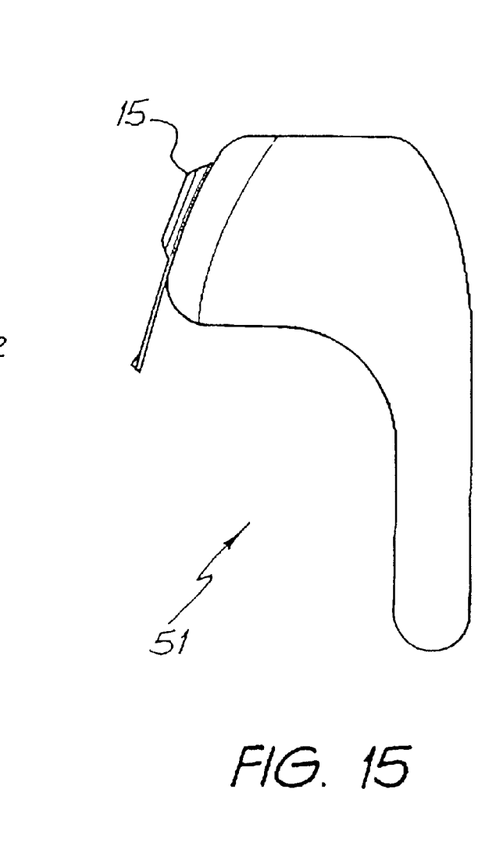
FIG. 15 is a side elevational view of the neck support cushion shown in FIG. 14.
Figure 16:
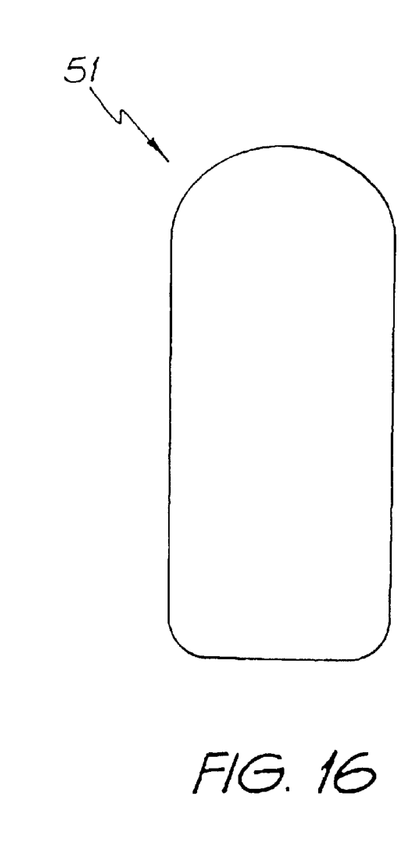
FIG. 16 is a rear view of the neck support cushion shown in FIG. 14.

The body part support cushion 51 shown in FIGS. 14 to 16 is in the form of a neck support device and, apart from its shape and configuration, is similar to the body part support cushion 10 shown in FIG. 1.

The body part support device of the present invention may be readily incorporated into a chair or pillow if required.

Figure 17:
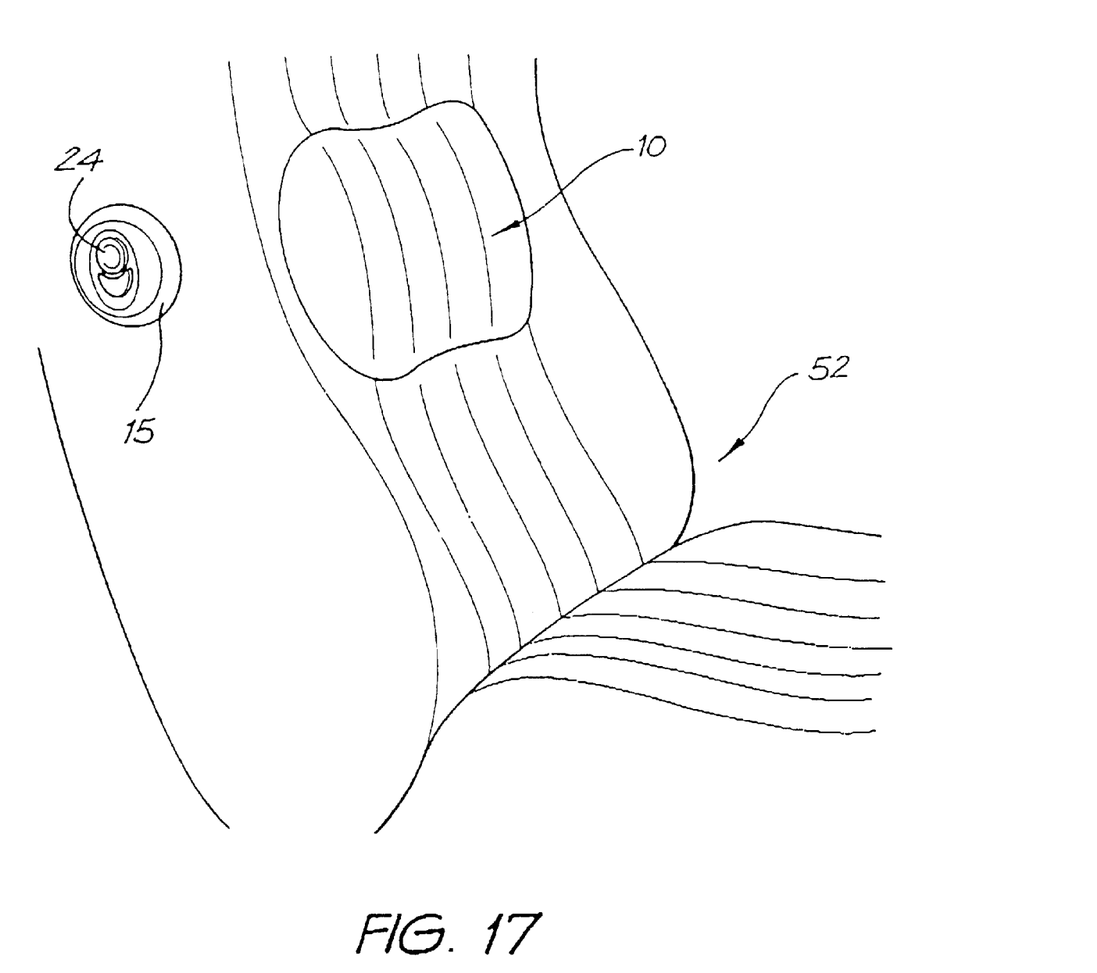
FIG. 17 is a partly broken away perspective view of a seat incorporating a cushion having a valve of the invention.

Although an exemplary embodiment of the present invention has been shown and described, it will be apparent to those having ordinary skill in the art that a number of changes, modifications or alterations to the invention as described herein may be made, none of which depart from the spirit or scope of the present invention. All such changes, modifications and alterations should therefore be seen as being within the scope of the present invention. For example the cushion 10 can be incorporated into a seat 52 as shown in FIG. 17.

What is claimed is:

1. A self-inflating device comprising:
   an envelope defining a closed space;
   a compressible material contained within the envelope;
   a normally closed valve adapted when opened to allow air into the envelope so that the compressed material can expand to enlarge the support device and to allow air out of the envelope when the material is compressed to reduce the support device in size, the valve including:
   a valve seat; and
   a valve member normally biased towards the valve seat to form a seal therebetween when the valve is closed in a closed position;
   a valve actuator for opening the valve, the valve actuator having:
   a body portion having an outer surface, the body portion being responsive to a depressive pressure on the outer surface for moving longitudinally toward or away from the valve member; and
   an outwardly projecting locking tab; and
   a movable locking arm adjacent the locking tab of the valve actuator, the locking arm having:
   a locking catch adapted to engage the locking tab of the valve actuator to hold the valve open; and
   a manually operable release tab which, when operated, releases the locking catch from the locking tab so that the valve returns to the closed position.

2. A chair or seat incorporating a device according to claim 1.

3. A device according to claim 1 wherein the envelope comprises a first sheet and a second sheet of flexible material joined together at respective peripheries of the first and second sheets.

4. A chair or seat incorporating a device according to claim 3.

5. A device according to claim 1 wherein the compressible material is a resilient open-celled foam material of a predetermined shape which the compressible material assumes when not under compression.

6. A chair or seat incorporating a device according to claim 5.

7. A device according to claim 5 wherein the predetermined shape of the foam material is suited for lumbar support.

8. A chair or seat incorporating a device according to claim 7.

9. A device according to claim 5 wherein the predetermined shape of the foam material is suited for neck support.

10. A chair or seat incorporating a device according to claim 9.

11. A device according to claim 1 wherein the valve actuator is connected to the valve member and spring biased so as to retain the valve member and valve seat in the closed position.

12. A chair or seat incorporating a device according to claim 11.

13. A device according to claim 1 wherein the valve actuator is arranged so that, upon an initial movement, the valve actuator separates the valve member and valve seat to allow adjustment of the volume of air in the device and, upon further movement of the valve actuator, is locked by the locking arm into a position which maintains the valve open.

14. A chair or seat incorporating a device according to claim 13.

15. A device according to claim 13 wherein the release tab is mounted on the locking arm which is movable between a first position in which the locking catch engages the locking tab so that the valve is locked open, and a second position in which the locking catch is disengaged from the locking tab so that the valve can close.

16. A chair or seat incorporating a device according to claim 15.

17. A device according to claim 15 wherein the valve member is connected to the valve actuator, the arrangement being such that the valve actuator opens the valve by moving the valve member away from the valve seat and that the locking arm is engaged only when the valve is fully open.

18. A chair or seat incorporating a device according to claim 17.

19. A device according to claim 1 further comprising restraining means adapted to retain the envelope and the compressible material in the envelope in a compressed state.

20. A chair or seat incorporating a device according to claim 19.

21. A device according to claim 1 wherein the locking arm comprises a rotatable member which is rotatable between a first position which the valve is locked open irrespective of the operation of the valve actuator, and a second position in which the valve is closed but subject to the operation of the valve actuator.

22. A chair or seat incorporating a device according to claim 21.

23. A device according to claim 21 wherein the valve further includes a valve base which incorporates the valve seat and wherein the rotatable member is threadedly engaged with the valve base.

24. A chair or seat incorporating a device according to claim 23.

25. A device according to claim 21 wherein the valve seat is connected to the rotatable member.

26. A chair or seat incorporating a device according to claim 25.

* * * * *